(12) United States Patent
Swartz et al.

(10) Patent No.: US 9,738,128 B2
(45) Date of Patent: Aug. 22, 2017

(54) GOLF CART HITCH

(71) Applicant: Swartz Group LLC, Lexington, KY (US)

(72) Inventors: Rocky Swartz, Lexington, KY (US); Neal Swartz, Olympia, KY (US)

(73) Assignee: SWARTZ GROUP LLC, Lexington, KY (US)

( * ) Notice: Subject to any disclaimer, the term of this patent is extended or adjusted under 35 U.S.C. 154(b) by 0 days.

(21) Appl. No.: 15/040,014

(22) Filed: Feb. 10, 2016

(65) Prior Publication Data

US 2016/0229242 A1    Aug. 11, 2016

Related U.S. Application Data

(60) Provisional application No. 62/114,367, filed on Feb. 10, 2015.

(51) Int. Cl.
*B60D 1/06* (2006.01)
*B60D 1/48* (2006.01)
*B60D 1/00* (2006.01)

(52) U.S. Cl.
CPC .............. *B60D 1/48* (2013.01); *B60D 1/06* (2013.01); *B60D 2001/001* (2013.01)

(58) Field of Classification Search
CPC . B60D 1/24; B60D 1/46; B60D 1/481; B60D 1/483; B60D 1/485; B60D 1/488
USPC ........................................................ 280/504
See application file for complete search history.

(56) References Cited

U.S. PATENT DOCUMENTS

| | | | | |
|---|---|---|---|---|
| 4,204,701 A | * | 5/1980 | Oltrogge ................ | B60D 1/075 280/491.5 |
| 4,204,702 A | * | 5/1980 | Oltrogge ................ | B60D 1/075 280/491.5 |
| 5,044,652 A | * | 9/1991 | Brisson .................... | B60D 1/07 280/416.1 |
| 5,106,114 A | * | 4/1992 | Haupt ...................... | B60D 1/07 280/416.1 |
| 5,702,118 A | * | 12/1997 | Hanson ................... | B60D 1/07 280/416.1 |
| 6,173,984 B1 | * | 1/2001 | Kay ........................ | B60D 1/145 280/491.5 |
| 9,272,592 B1 | * | 3/2016 | Kringstad ............. | B60D 1/565 |
| 2002/0171225 A1 | * | 11/2002 | Adair ..................... | B60D 1/485 280/491.5 |
| 2007/0080516 A1 | * | 4/2007 | Simmons ................ | B60D 1/40 280/491.3 |

* cited by examiner

*Primary Examiner* — Tony Winner
(74) *Attorney, Agent, or Firm* — King & Schickli, PLLC

(57) ABSTRACT

A golf cart hitch assembly may be attached to a golf cart in a manner to evenly distribute the weight of a towed element across the frame of the golf cart. This may be helpful in towing a relatively substantial element, such as a trailer. One advantage of the inventor's golf cart hitch is that it requires relatively little or no permanent modification to the golf cart itself. Another advantage is the ability to attach one or more conventional ball hitches at different locations on the assembly. In its simplest form, the assembly includes a pair of brackets for attachment to the frame of the golf cart, such as via bolts or screws, and a plate attached to both brackets, the plate including one or more locations for the attachment of one or more ball hitches.

17 Claims, 4 Drawing Sheets

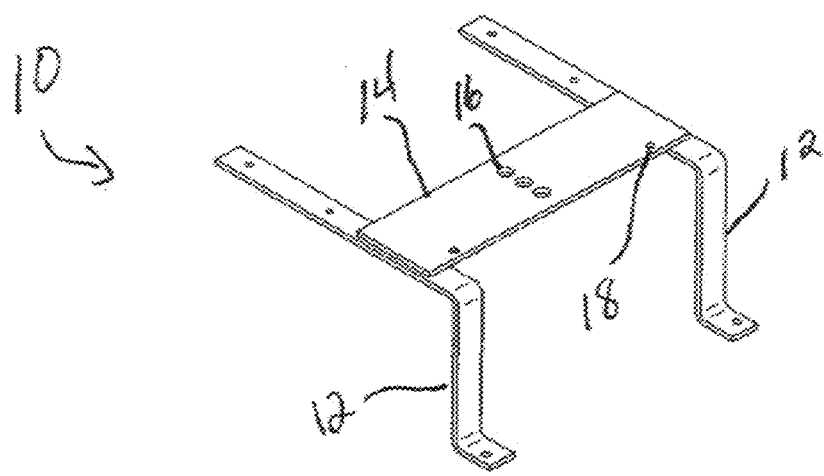
Fig. 1
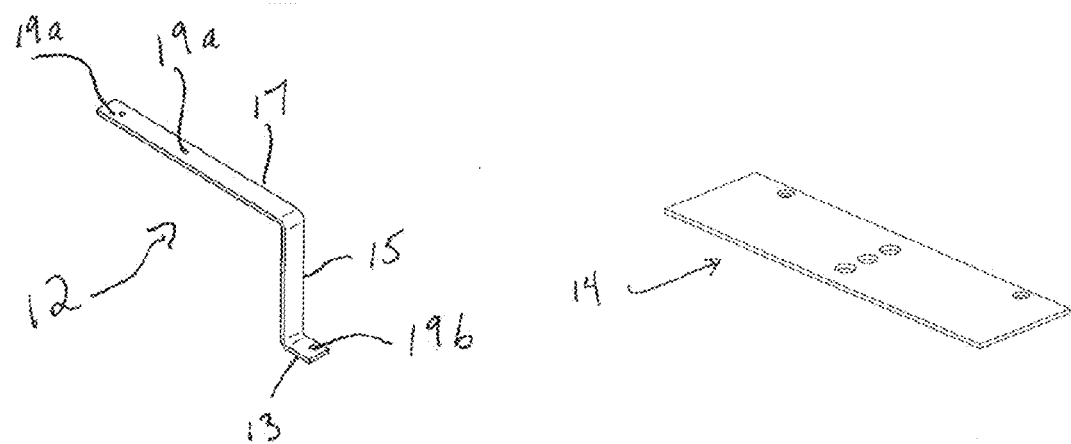
Fig. 2
Fig. 3

GOLF CART HITCH

This application claims priority to U.S. PROVISIONAL Patent Application No. 62/114,367, filed on Feb. 10, 2015, the disclosure of which is hereby incorporated by reference.

TECHNICAL FIELD

The present invention relates to the field of towing an item behind a golf cart, and more particularly to a bracket for mounting a towing attachment to a golf cart.

BACKGROUND OF THE INVENTION

Golf carts are often used as an energy-efficient means of transporting people and/or goods and equipment over relatively short distances. They may be used on golf courses, but are also often used in communities and at outdoor events held at locations spanning a distance that may be inconvenient for walking. Many such golf carts include rear facing auxiliary seating (typically for 2 additional people), and may include a space for a small amount of cargo or as a foot rest for the people sitting in the rear facing seating.

Certain golf cart hitch assemblies are known, which are normally adapted to carry light-weight items such as a golf bag or small container. However, a need has been identified to provide a more substantial hitch for a golf cart capable of towing a trailer or other wheeled vehicle or assembly behind a golf cart. More specifically, a need has been identified for providing a removable, substantial hitch which does not significantly alter the configuration of the golf cart or frame.

BRIEF SUMMARY OF THE INVENTION

The present disclosure addresses these needs, by providing a trailer hitch assembly adapted for connection to a golf cart, wherein the trailer hitch assembly requires little if any modification to the golf cart itself, yet when it is connected, is capable of towing a wheeled vehicle of substantial weight, and evenly distributing said weight across the frame of the golf cart.

In a first embodiment, a trailer hitch assembly for attachment to a golf cart is disclosed, said assembly comprising at least two fixing members configured for attachment to the golf cart, and at least one support member configured for attaching to at least one ball hitch. The at least one support member may connect the at least two fixing members together.

In one aspect, the support member includes at least one primary aperture for attaching the at least one ball hitch. The support member may include a plurality of primary apertures for attaching the at least one ball hitch. In one aspect, the primary aperture or the plurality of primary apertures may be positioned along a center of the support member. In addition, the assembly may include at least one secondary aperture for attaching a chain between the support member and a tow-behind cart. This at least one secondary aperture may be provided in the support member.

The support member may be welded to that at least two fixing members. In one aspect, the fixing members may be connected at each of two opposite ends of the support member.

Each of the fixing members may comprise a bracket configured for attaching to the frame of the golf cart, said bracket including at least three sections, each of the three sections defining a distinct plane. A portion of each of the fixing members may be adapted to be sandwiched between at least two elements of a frame of the golf cart and connected to said at least two elements of the frame. Furthermore, at least a portion of each of the fixing members may be adapted to be fixed to a base of a frame of the golf cart.

In a further embodiment, an improved golf cart is disclosed, said improved golf cart for transporting people and objects, said golf cart including a frame with a first frame section and an L-bar bracket. The improvement of the golf cart comprises a trailer hitch assembly including at least two fixing members, each of the fixing members separated by and connected to a support member, said support member adapted to receive a ball hitch wherein at least a portion of at least one of the fixing members is adapted to be fit directly between the first frame section and the L-bar bracket.

The support member may be welded to the two fixing members. In one aspect, the support member may include a plurality of receiving apertures for receiving a ball hitch. In a further aspect, the fixing members may include at least one fixing aperture for aligning with a first existing aperture in the L-bar bracket and a second existing aperture in the first frame section, such that at least one fixing element may connect the L-bar bracket, the support member, and the first frame section through the fixing aperture and the first and second existing apertures. For example, the fixing element may comprise a bolt, which may connect the L-bar bracket, the fixing member, and the first frame section. Each of the fixing members may include a first portion for aligning with the L-bar bracket and the first frame section, a second portion substantially perpendicular to the first portion, and a third portion substantially parallel to the first portion, wherein the third portion is adapted to attach to a second frame section, separate from the first frame section. The first and second frame sections may be generally planar and may be parallel to one another.

In a further embodiment, a trailer hitch assembly for attachment to a golf cart is disclosed. The assembly includes at least two brackets configured for attaching directly to a frame of the golf cart, and at least one plate including at least one aperture configured for receiving a ball hitch, said plate being generally planar in shape and connecting the at least two brackets.

In this embodiment, each of the at least two brackets may include an upper planar section, an intermediate planar section, and a lower planar section, said upper and lower planar sections substantially parallel to one another, and wherein the intermediate planar section connects the upper planar section to the lower planar section. The intermediate planar section may be substantially perpendicular to the upper planar section.

The upper planar section of each of the at least two brackets may comprise at least one fixing aperture configured for receiving a fixing element adapted to fix the upper planar section to the frame of the golf cart. The lower planar section of each of the at least two brackets may comprise at least one fixing aperture configured for receiving a fixing element adapted to fix the upper planar section to the frame of the golf cart.

In one aspect, the plate may be connected at a first end to a first of the at least two brackets, and is connected at a second end to a second of the at least two brackets.

BRIEF DESCRIPTION OF THE DRAWINGS

The present invention will become more fully understood from the detailed description and the accompanying drawings, wherein:

FIG. 1 is a perspective view of the trailer hitch assembly for attachment to a golf cart of the present invention;

FIG. 2 is a perspective view of a bracket of the assembly of FIG. 1;

FIG. 3 is a perspective view of a support plate of the assembly of FIG. 1;

DETAILED DESCRIPTION

Figure 7:
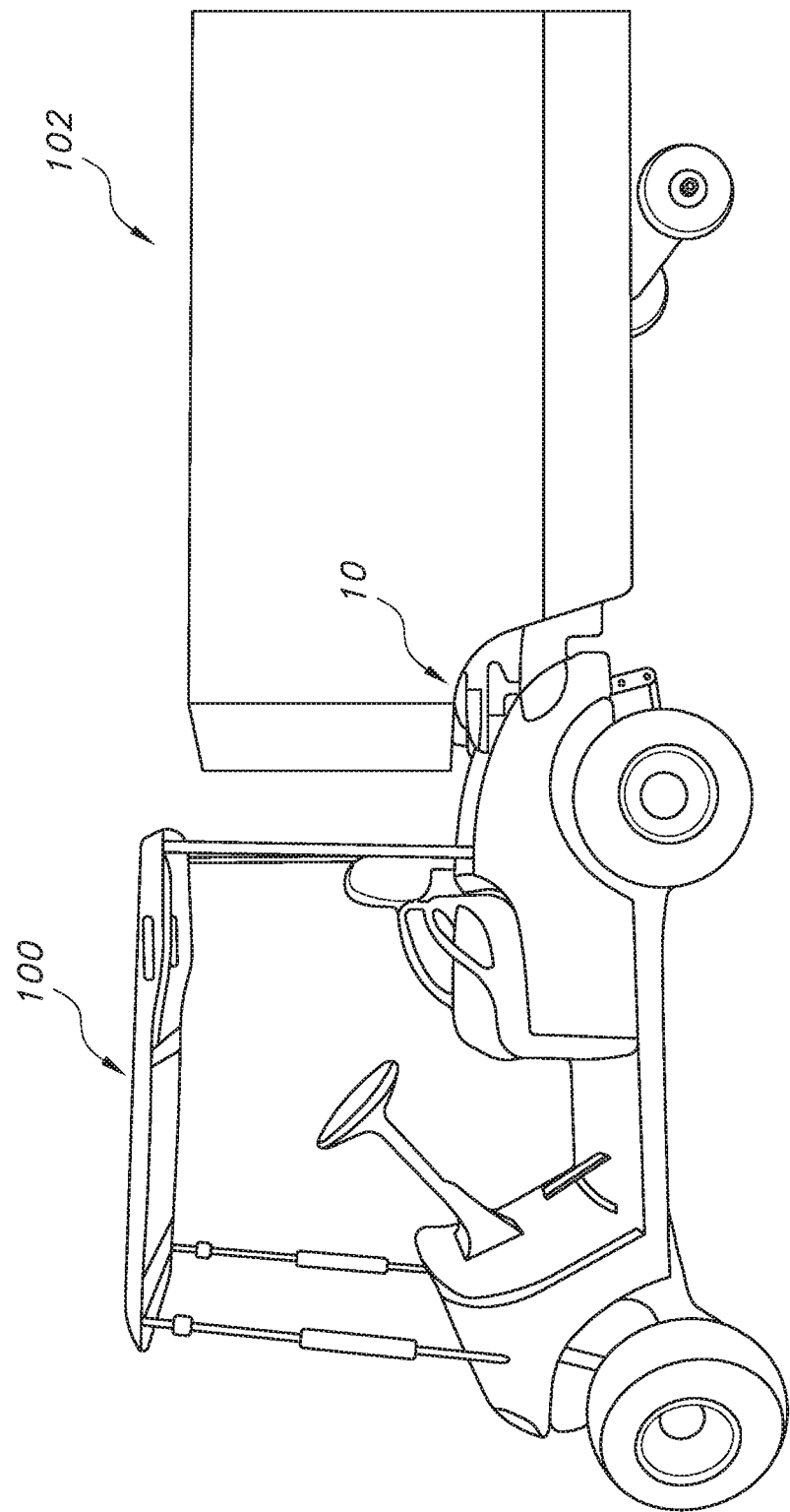
FIG. 7 is a side view of a golf cart connected to a trailer via the trailer hitch assembly of FIG. 1.

This disclosure pertains to a hitch assembly 10 for attachment to a vehicle, such as a golf cart 100. With reference to FIG. 7, the golf cart 100 may be attached to a tow-behind cart 102 via the hitch assembly 10.

As illustrated in the figures, the hitch assembly 10 may include a support member for a ball hitch 20. In use, the ball hitch 20 may be a conventional ball hitch that may be attached to the hitch assembly 10, or alternately may be integrally constructed with the hitch assembly.

In one embodiment, as illustrated in FIG. 1, the support member may be in the form of an attachment plate 14. The attachment plate 14 may include one or more primary apertures 16 for use in attaching the ball hitch 20 to the attachment plate 14. In one aspect, the attachment plate 14 may include a plurality of primary apertures 16 for adjustably placing the ball hitch 20 at various positions on the attachment plate 14. The attachment plate 14 may further include one or more secondary apertures 18, which in use may be attached to a chain (not shown) for secondarily securing the golf cart 100 to the tow-behind cart 102.

The hitch assembly 10 may further include one or more fixing members 12 for fixing the hitch assembly 10 to the golf cart 100. As shown in FIG. 2, the fixing member 12 may be in the form of a bracket with a plurality of bracket sections such as first, second and third bracket sections 13, 15, 17, respectively. The bracket sections may define different planes. The planes of one or more of the first, second, and third bracket sections 13, 15, 17, may be positioned parallel to or perpendicular to the planes of the other bracket sections. As illustrated in FIG. 2, the lower bracket section 13 is substantially perpendicular to the middle bracket section 15, while being substantially parallel to the upper bracket section 17.

The fixing member 12 may further include one or more fixing apertures 19a, 19b for attaching the fixing member 12 to the frame F of the golf cart 100. These fixing apertures 19a, 19b may be adapted to receive one or more bolts or other fixing elements for securing the fixing member 12 to the golf cart 100. As illustrated in FIG. 2, the fixing member 12 includes a plurality of first fixing apertures 19a associated with third bracket section 17, and at least one second fixing aperture 19b associated with the first bracket section 13. In one aspect, one or more of the fixing apertures 19a, 19b may be threaded to engage threads associated with a bolt or other fixing element.

Figure 4:
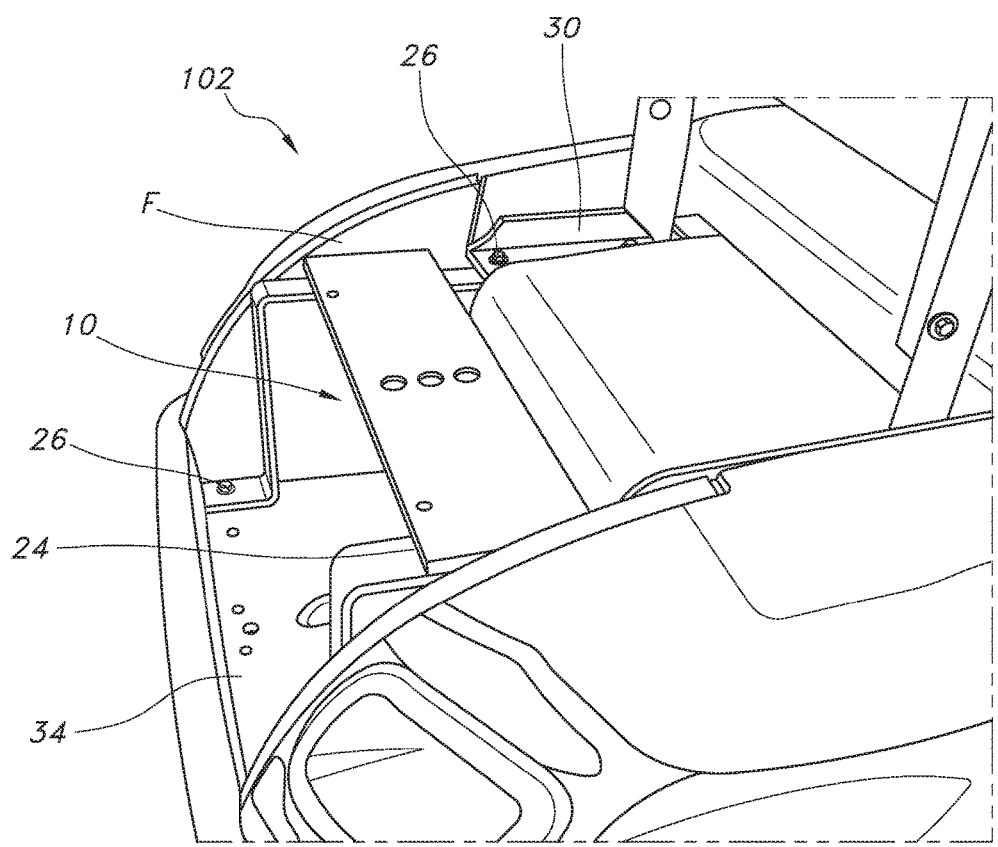
FIG. 4 is a perspective view of the trailer hitch assembly of FIG. 1 attached to a golf cart.

The attachment plate 14 may be secured to one or more fixing members 12 in order to form the assembled hitch assembly 10. With further reference to FIGS. 1 and 4, two fixing members 12 may be attached to a single attachment plate 14, such as via one or more welds 24. Alternately, the attachment plate 14 may be secured to the fixing member(s) 12 via any conventional securing element, such as a bolt.

In one aspect, the attachment plate 14 may define a major plane parallel to the third bracket section 17. Accordingly, the attachment plate 14 may be attached to the bracket such that a lower face of plate 14 lies flat against an upper face of bracket 12. Each of the lower face of plate 14 and the upper face of bracket 12 may comprise a planar surface. In an alternate embodiment, the attachment plate 14 may be attached to a lower surface of bracket 12. Similarly, the upper face of the plate 14 may lay flat against a lower face of bracket 12.

In use, as illustrated in FIG. 4, the hitch assembly 10 may be secured to the frame F of the golf cart 100. One or more securing elements such as bolts 26 may be used to attach the hitch assembly to the frame F. For example, first bolts 26 may pass through upper fixing apertures 19a in order to secure the upper bracket section 17 to an upper frame element 32 (see FIG. 5).

In one embodiment, a secondary securing element 30, such as an L-bar bracket, may further secure the upper bracket section 17 to the frame F. The secondary securing element 30 may comprise a portion of the frame of the golf cart 100, said secondary securing element 30 being an element of the golf cart 100 apart from the hitch assembly 10, and present prior to any modification of the golf cart 100 in association with the attachment of the hitch assembly 10.

As illustrated in FIG. 4, the upper bracket section 17 of bracket 12 may be positioned between the L-bar bracket 30 and the upper frame element 32. For example, in the case of the secondary securing element 30 being a portion of the frame F apart from hitch assembly 10, the L-bar bracket 30 may be removed from the frame F of the cart 100, the bracket 12 may be placed in contact with the frame F beneath the L-bar bracket 30, and the L-bar bracket may be returned to its original position on top of the bracket 12, thereby sandwiching the bracket 12 between the L-bar bracket 30 and the frame F. The first bolts 26 may pass through each of the L-bar bracket 30, the upper bracket section 17, and the upper frame element 32, in order to securely attach the upper bracket section 17 to the golf cart 100.

In this position sandwiching the bracket 12, a first leg of the L-bar bracket 30 may contact the upper face of the upper bracket section 17. A second leg of the L-bar bracket 30 may be attached to the frame. For example, the second leg of the L-bar bracket may contact a sidewall of the frame and be attached thereto, such as via a weld or other fixing member such as a bolt.

Furthermore, the lower bracket section 13 may be secured to a lower frame element 34, such as a floor of the golf cart 100. For example, second bolts 26 may pass through one or more lower fixing apertures 19b of the lower bracket section 13 and into the lower frame element 34 of the golf cart 100. In this manner, the upper frame element 17 and the lower frame element 13 may be securely fastened to the frame F in order to provide stability for towing the tow-behind cart 102. Although not illustrated, it is also possible to secure the middle bracket section 15 to the frame F as well, such as via a weld or other fixing element. Attaching the hitch assembly 10 to the frame F of the golf cart 100 at multiple locations provides a secure hitch, capable of distributing a towing load across the frame F, thereby providing sufficient stability to tow a heavy load.

Figure 5:
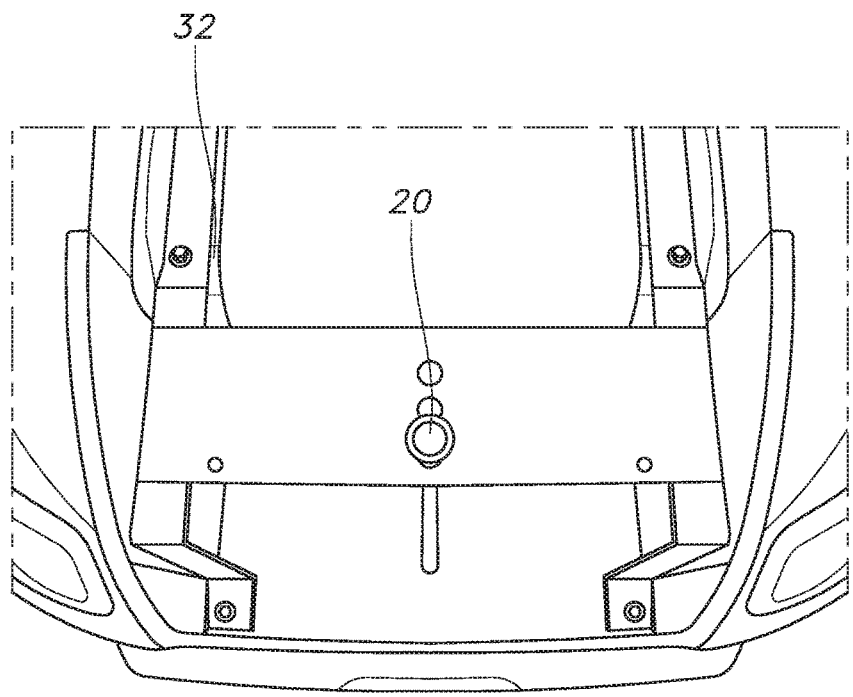
FIG. 5 is an overhead view of the assembly attached to the golf cart of FIG. 4, including a ball hitch.
Figure 6:
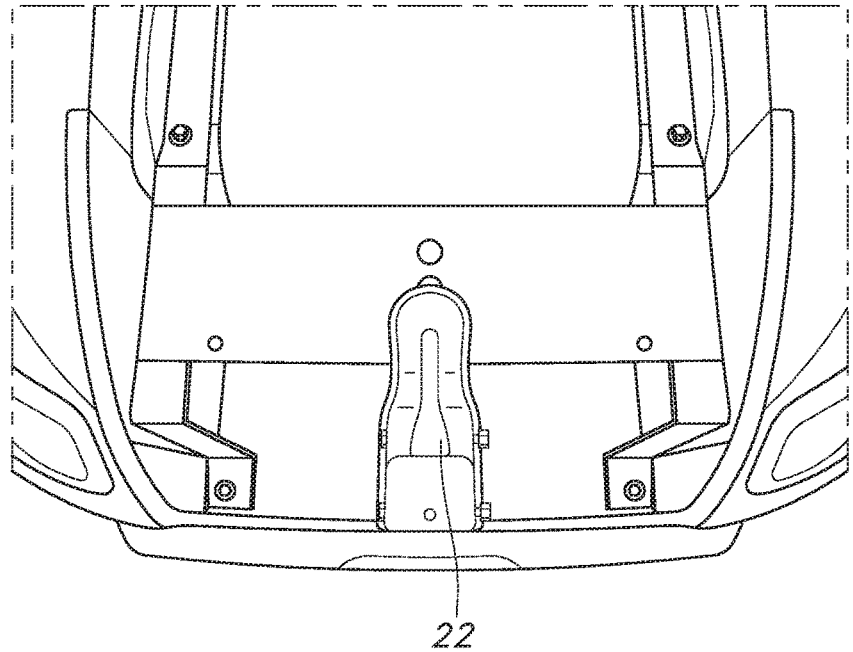
FIG. 6 is an overhead view of the assembly of FIG. 5, including a ball hitch receiver.

With reference to FIGS. 5 and 6, a ball hitch 20 may be secured to one of the primary apertures 16 of the hitch assembly 10. The ball hitch 20 may be attached to the plate 14 of the hitch assembly 10, either before or after the hitch assembly 10 is attached to the frame of the golf cart 100. In use, a hitch receiver 22 may be attached to the tow-behind cart 102, and may be adapted for engagement with the ball hitch 20 in a standard manner. The hitch receiver 22 may be a conventional receiver, or may be sized and/or adapted to receive any sized ball hitch 20 that has been attached to the hitch assembly 10.

The foregoing descriptions of various embodiments provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. A trailer hitch assembly for attachment to a golf cart comprising:
    at least two fixing members configured for attachment to the golf cart, each of said fixing members comprising an upper planar section, an intermediate planar section, and a lower planar section, wherein the intermediate planar section connects the upper planar section to the lower planar section; and
    at least one support member connecting the at least two fixing members, said support member configured for attaching to at least one ball hitch;
    wherein the at least one support member connects the upper planar section of a first of the at least two fixing members to the upper planar section of a second of the at least two fixing members.

2. The assembly of claim 1, wherein the at least one support member includes at least one primary aperture for attaching the at least one ball hitch.

3. The assembly of claim 2, wherein the at least one primary aperture includes a plurality of primary apertures for attaching the at least one ball hitch.

4. The assembly of claim 3, further including at least one secondary aperture for attaching a chain between the at least one support member and a tow-behind cart.

5. The assembly of claim 1, wherein the at least one support member is welded to that at least two fixing members.

6. The assembly of claim 1, wherein each of the fixing members comprises a bracket configured for attaching to the frame of the golf cart, said bracket including at least three sections, each of the three sections defining a distinct plane.

7. The assembly of claim 1, wherein a portion of each of the fixing members is adapted to be sandwiched between at least two elements of a frame of the golf cart and connected to said at least two elements of the frame.

8. The assembly of claim 1, wherein at least a portion of each of the fixing members is adapted to be fixed to a base of a frame of the golf cart.

9. An improved golf cart for transporting people and objects, said golf cart including a frame with a first frame section and an L-bar bracket, in which the improvement comprises:
    a trailer hitch assembly including at least two fixing members, each of the at least two fixing members separated by and connected to a support member, said support member adapted to receive a ball hitch;
    wherein at least a portion of at least one of the fixing members is adapted to be fit directly between the first frame section and the L-bar bracket, and
    wherein the at least two fixing members include at least one fixing aperture for aligning with a first existing aperture in the L-bar bracket and a second existing aperture in the first frame section, such that at least one fixing element may connect the L-bar bracket, the support member, and the first frame section through the at least one fixing aperture and the first and second existing apertures.

10. The golf cart of claim 9, wherein the support member is welded to the at least two fixing members.

11. The golf cart of claim 9, wherein the support member includes a plurality of receiving apertures for receiving a ball hitch.

12. The golf cart of claim 9, wherein each of the at least two fixing members includes a first portion for aligning with the L-bar bracket and the first frame section, a second portion substantially perpendicular to the first portion, and a third portion substantially parallel to the first portion, wherein the third portion is adapted to attach to a second frame section, separate from the first frame section.

13. A trailer hitch assembly for attachment to a golf cart comprising:
    at least two brackets configured for attaching directly to a frame of the golf cart wherein each of the at least two brackets comprises an upper planar section, an intermediate planar section, and a lower planar section, said upper and lower planar sections substantially parallel to one another, and wherein the intermediate planar section connects the upper planar section to the lower planar section; and
    at least one plate including at least one aperture configured for receiving a ball hitch, the at least one plate being generally planar in shape and connecting the at least two brackets,
    wherein the at least one plate is attached to an upper surface of the upper planar section.

14. The trailer hitch assembly of claim 13, wherein the intermediate planar section is substantially perpendicular to the upper planar section.

15. The trailer hitch assembly of claim 13, wherein the upper planar section of each of the at least two brackets comprises at least one fixing aperture configured for receiving a fixing element adapted to fix the upper planar section to the frame of the golf cart.

16. The trailer hitch assembly of claim 15, wherein the lower planar section of each of the at least two brackets comprises at least one fixing aperture configured for receiving a fixing element adapted to fix the lower planar section to the frame of the golf cart.

17. The trailer hitch assembly of claim 13, wherein the at least one plate is connected at a first end to a first of the at least two brackets, and is connected at a second end to a second of the at least two brackets.

* * * * *